United States Patent
Tipton et al.

(10) Patent No.: US 9,547,549 B2
(45) Date of Patent: Jan. 17, 2017

(54) HANDLING FILE SYSTEM CORRUPTION

(71) Applicant: Microsoft Corporation, Redmond, WA (US)

(72) Inventors: William R. Tipton, Seattle, WA (US); Rajsekhar Das, Kirkland, WA (US); Malcolm James Smith, Bellevue, WA (US); Shao-Chuan Wang, Bellevue, WA (US); Surendra Verma, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 677 days.

(21) Appl. No.: 13/778,134

(22) Filed: Feb. 27, 2013

(65) Prior Publication Data
US 2014/0201163 A1 Jul. 17, 2014

Related U.S. Application Data

(60) Provisional application No. 61/753,377, filed on Jan. 16, 2013.

(51) Int. Cl.
*G06F 7/00* (2006.01)
*G06F 17/30* (2006.01)
*G06F 11/10* (2006.01)
*G06F 11/07* (2006.01)
*G06F 11/20* (2006.01)

(52) U.S. Cl.
CPC ....... *G06F 11/1004* (2013.01); *G06F 11/0706* (2013.01); *G06F 11/0793* (2013.01); *G06F 11/2089* (2013.01)

(58) Field of Classification Search
None
See application file for complete search history.

(56) References Cited

U.S. PATENT DOCUMENTS

| 7,694,191 | B1 | 4/2010 | Bono et al. |
| 8,195,760 | B2 | 6/2012 | Lacapra et al. |
| 2004/0172416 | A1* | 9/2004 | Murakami et al. ........ 707/104.1 |
| 2005/0246612 | A1* | 11/2005 | Leis et al. .................... 714/763 |
| 2007/0073688 | A1* | 3/2007 | Fry ................... G06F 17/30312 |

(Continued)

FOREIGN PATENT DOCUMENTS

WO  WO 2009025683 A1 * 2/2009 .......... G06F 11/0727

OTHER PUBLICATIONS

Cong Wang; Privacy-Preserving Public Auditing for Data Storage Security in Cloud Computing; 2010; IEEE; p. 1-9.*

(Continued)

*Primary Examiner* — Amresh Singh
*Assistant Examiner* — Jermaine Mincey
(74) *Attorney, Agent, or Firm* — Sunah Lee; Dan Choi; Micky Minhas

(57) ABSTRACT

Aspects of the subject matter described herein relate to file system technology. In aspects, a mechanism is described that allows a file system to handle corrupted file system metadata in a way that provides high availability. When corrupted metadata is detected, the corrupted metadata may be deleted while the file system remains online and available to service file input/output operations that involve non-corrupted metadata.

20 Claims, 8 Drawing Sheets

(56) References Cited

U.S. PATENT DOCUMENTS

| | | | |
|---|---|---|---|
| 2008/0282184 A1* | 11/2008 | Rose | G06F 17/30038 715/772 |
| 2012/0159243 A1* | 6/2012 | Havewala et al. | 714/15 |
| 2012/0239630 A1* | 9/2012 | Wideman et al. | 707/692 |
| 2013/0339314 A1* | 12/2013 | Carpentier et al. | 707/692 |
| 2014/0250155 A1* | 9/2014 | Chen et al. | 707/823 |

OTHER PUBLICATIONS

Sinofsky, Steven, "Building the next generation file system for Windows: ReFS", Retrieved at <<http://blogs.msdn.com/b/b8/archive/2012/01/16/building-the-next-generation-file-system-for-windows-refs.aspx>>, Jan. 17, 2012, pp. 47.

"Checking and repairing a file system", Retrieved at <<http://publib.boulder.ibm.com/infocenter/ciresctr/vxrx/index.jsp?topic=%2Fcom.ibm.cluster.gpfs.v3r5.0.7.gpfs100.doc%2Fbl1adm_chkfs.htm>>, Retrieved Date: Jan. 22, 2013, pp. 3.

\* cited by examiner

HANDLING FILE SYSTEM CORRUPTION

CROSS REFERENCE TO RELATED APPLICATION

This application claims the benefit of U.S. Provisional Application No. 61/753,377, filed Jan. 16, 2013, entitled HANDLING FILE SYSTEM CORRUPTION, which application is incorporated herein in its entirety.

BACKGROUND

Data on various electronic storage media may become corrupted over time. With some types of media such as CDs, DVDs, magnetic tapes, floppy disks and others, the media actually starts to decay and consequently loses data. With other types of media such as EPROMs and flash memory, electrical charges may dissipate leading to lost data. Although it is generally known that hard drives may lose data when they crash or otherwise become inoperative, what is not well known, at least by those outside of the industry, is that even well-functioning hard drives may have data that becomes silently or otherwise corrupted.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

Briefly, aspects of the subject matter described herein relate to file system technology. In aspects, a mechanism is described that allows a file system to handle corrupted file system metadata in a way that provides high availability. When corrupted metadata is detected, the corrupted metadata may be deleted while the file system remains online and available to service file input/output operations that involve non-corrupted metadata.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" should be read as "at least one aspect." Identifying aspects of the subject matter described in the Detailed Description is not intended to identify key or essential features of the claimed subject matter.

The aspects described above and other aspects of the subject matter described herein are illustrated by way of example and not limited in the accompanying figures in which like reference numerals indicate similar elements and in which:

DETAILED DESCRIPTION

Definitions

As used herein, the term "includes" and its variants are to be read as open-ended terms that mean "includes, but is not limited to." The term "or" is to be read as "and/or" unless the context clearly dictates otherwise. The term "based on" is to be read as "based at least in part on." The terms "one embodiment" and "an embodiment" are to be read as "at least one embodiment." The term "another embodiment" is to be read as "at least one other embodiment."

As used herein, terms such as "a," "an," and "the" are inclusive of one or more of the indicated item or action. In particular, in the claims a reference to an item generally means at least one such item is present and a reference to an action means at least one instance of the action is performed.

Sometimes herein the terms "first", "second", "third" and so forth may be used. Without additional context, the use of these terms in the claims is not intended to imply an ordering but is rather used for identification purposes. For example, the phrases "first version" and "second version" do not necessarily mean that the first version is the very first version or was created before the second version or even that the first version is requested or operated on before the second version. Rather, these phrases are used to identify different versions.

Headings are for convenience only; information on a given topic may be found outside the section whose heading indicates that topic.

Other definitions, explicit and implicit, may be included below.

Exemplary Operating Environment

Figure 1:
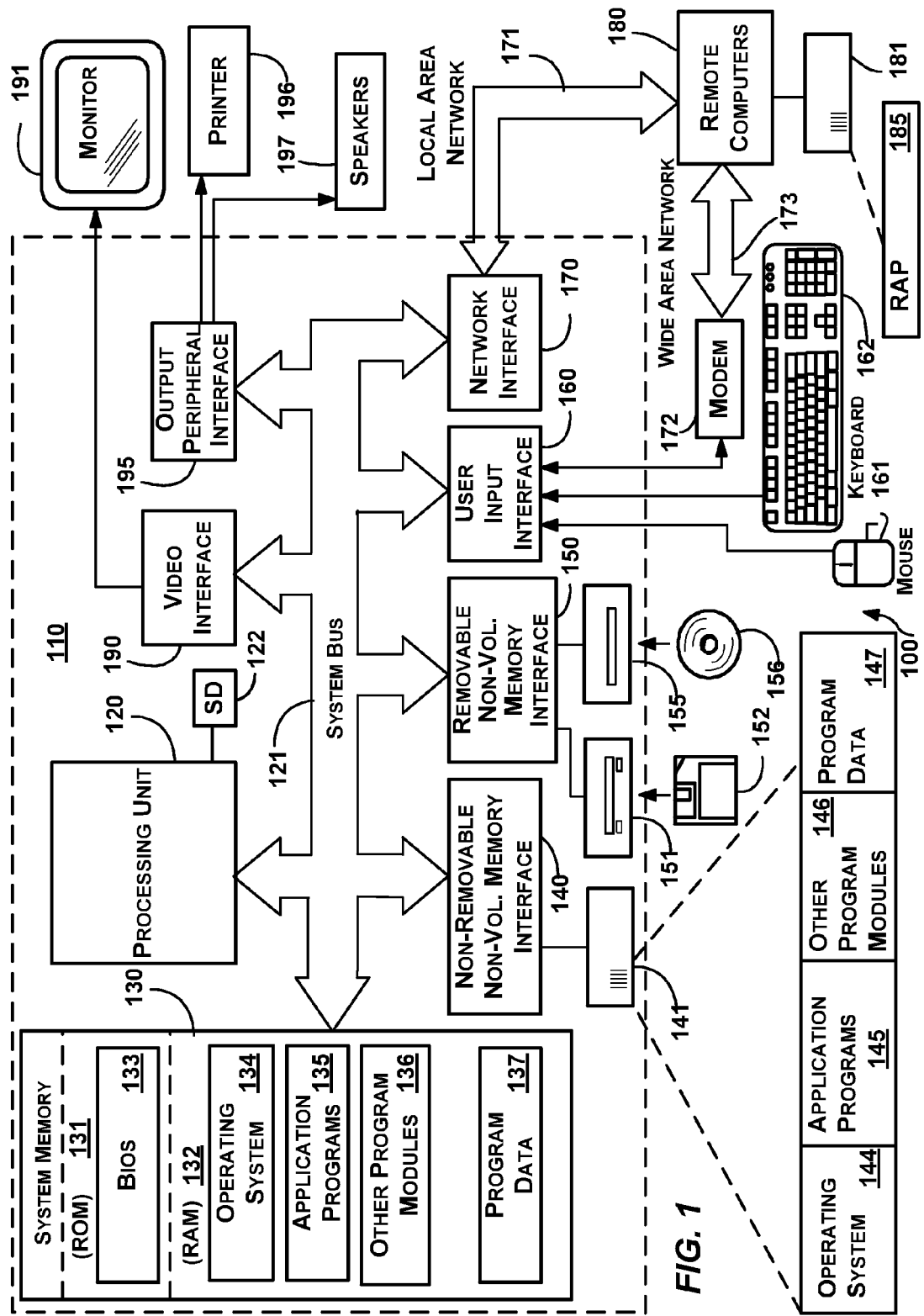
FIG. 1 is a block diagram representing an exemplary general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well-known computing systems, environments, or configurations that may be suitable for use with aspects of the subject matter described herein comprise personal computers, server computers—whether on bare metal or as virtual machines—, hand-held or laptop devices, multiprocessor systems, microcontroller-based systems, set-top boxes, programmable and non-programmable consumer electronics, network PCs, minicomputers, mainframe computers, personal digital assistants (PDAs), gaming devices, printers, appliances including set-top, media center, or other appliances, automobile-embedded or attached computing devices, other mobile devices, phone devices including cell phones, wireless phones, and wired phones, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Alternatively, or in addition, the functionality described herein may be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), and the like.

With reference to FIG. 1, an exemplary system for implementing aspects of the subject matter described herein includes a general-purpose computing device in the form of a computer 110. A computer may include any electronic device that is capable of executing an instruction. Components of the computer 110 may include a processing unit 120, a system memory 130, and one or more system buses (represented by system bus 121) that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, Peripheral Component Interconnect Extended (PCI-X) bus, Advanced Graphics Port (AGP), and PCI express (PCIe).

The processing unit 120 may be connected to a hardware security device 122. The security device 122 may store and be able to generate cryptographic keys that may be used to secure various aspects of the computer 110. In one embodiment, the security device 122 may comprise a Trusted Platform Module (TPM) chip, TPM Security Device, or the like.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media.

Computer storage media includes both volatile and nonvolatile, removable and non-removable media implemented in any method or technology for storage of information such as computer-readable instructions, data structures, program modules, or other data. Computer storage media includes RAM, ROM, EEPROM, solid state storage, flash memory or other memory technology, CD-ROM, digital versatile discs (DVDs) or other optical disk storage, magnetic cassettes, magnetic tape, magnetic disk storage or other magnetic storage devices, or any other medium which can be used to store the desired information and which can be accessed by the computer 110. Computer storage media does not include communication media.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM, DVD, or other optical media. Other removable/non-removable, volatile/nonvolatile computer storage media that can be used in the exemplary operating environment include magnetic tape cassettes, flash memory cards and other solid state storage devices, digital versatile discs, other optical discs, digital video tape, solid state RAM, solid state ROM, and the like. The hard disk drive 141 may be connected to the system bus 121 through the interface 140, and magnetic disk drive 151 and optical disc drive 155 may be connected to the system bus 121 by an interface for removable nonvolatile memory such as the interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies.

A user may enter commands and information into the computer 110 through input devices such as a keyboard 162 and pointing device 161, commonly referred to as a mouse, trackball, or touch pad. Other input devices (not shown) may include a microphone (e.g., for inputting voice or other audio), joystick, game pad, satellite dish, scanner, a touch-sensitive screen, a writing tablet, a camera (e.g., for inputting gestures or other visual input), or the like. These and other input devices are often connected to the processing unit 120 through a user input interface 160 that is coupled to the system bus, but may be connected by other interface and bus structures, such as a parallel port, game port or a universal serial bus (USB).

Through the use of one or more of the above-identified input devices a Natural User Interface (NUI) may be established. A NUI, may rely on speech recognition, touch and stylus recognition, gesture recognition both on screen and adjacent to the screen, air gestures, head and eye tracking, voice and speech, vision, touch, gestures, machine intelligence, and the like. Some exemplary NUI technology that may be employed to interact with a user include touch sensitive displays, voice and speech recognition, intention and goal understanding, motion gesture detection using depth cameras (such as stereoscopic camera systems, infrared camera systems, RGB camera systems, and combinations thereof), motion gesture detection using accelerometers/gyroscopes, facial recognition, 3D displays, head, eye, and gaze tracking, immersive augmented reality and virtual reality systems, as well as technologies for sensing brain activity using electric field sensing electrodes (EEG and related methods).

A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include phone networks, near field networks, and other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 may include a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Handling Corruption

As mentioned previously, data on storage media may become corrupted. Corrupted data may include the data of the files and/or the file system metadata associated with the files. Aspects of the subject matter described herein provide approaches for handling file system corruption and more particularly corruption of file system metadata.

In accordance with aspects of the subject matter described herein, data may be verified and auto-corrected. Data may become corrupted due to a number of reasons, may be verified upon reading or otherwise, and, when possible, corrected automatically. Updates to file system metadata may be written in an allocate-on-write approach to avoid the possibility of "torn writes." An allocate-on-write approach does not update metadata in-place but rather writes updates to metadata to a different location in an atomic fashion.

In one implementation, repairs to the file system may occur while the file system is online. In other words, in this implementation, the file system may not be taken offline to deal with file system corruption. In the event of corruptions, faults may be isolated while allowing access to the rest of the volume. This may be done while salvaging the maximum amount of data possible while the file system is live.

In one implementation, the file system may be located on storage that maintains redundant copies of data and that uses these redundant copies to repair corrupted data automatically where possible. In another implementation, the file system may be located on storage that does not maintain redundant copies of the data. In the above implementations, corruptions that are not automatically corrected by the underlying storage may be isolated and addressed while allowing access to the rest of the volume. In one implementation, the entire volume may be locked momentarily while destroying in memory (e.g., RAM) data structures associated with corrupted metadata.

Figure 2:
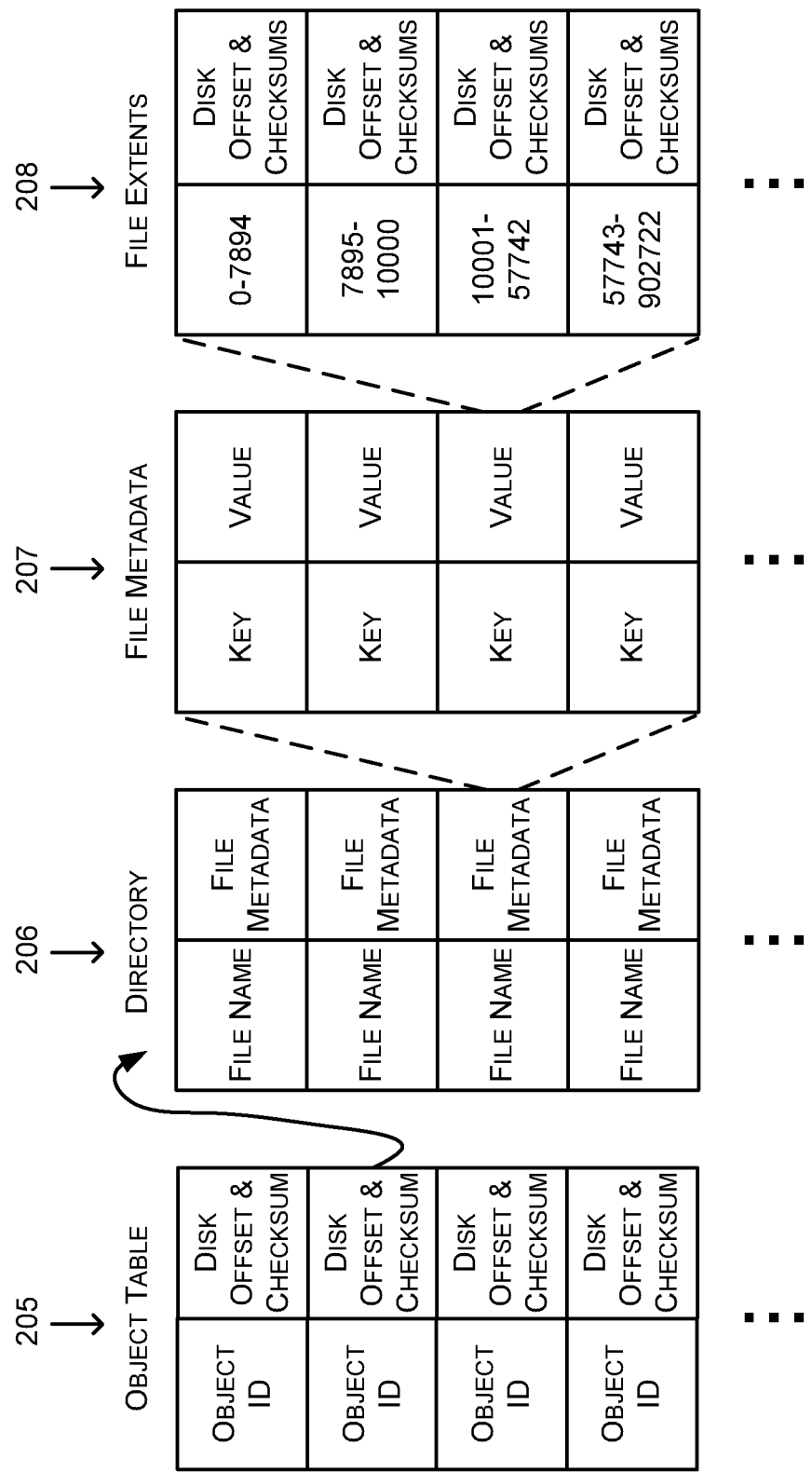
FIG. 2 is a block diagram that generally represents a portion of an exemplary data structure that may be used for file system metadata in accordance with aspects of the subject matter described herein.

In one implementation, a file system may maintain metadata about a file system using a tree data structure. FIG. 2 is a block diagram that generally represents a portion of an exemplary data structure that may be used for file system metadata in accordance with aspects of the subject matter described herein.

The data structure 200 includes an object table 205 that includes rows that identify objects. Each row includes an object ID and a disk offset and checksum. One of the entries is shown as referring to the directory table 206. The directory table 206 includes file names and file metadata that are implemented as table embedded within a row of the directory table 206. One of the rows of the directory table 206 is expanded and illustrated as file metadata 206, which includes key/value pairs. The rows within the file metadata 207 represent various file attributes. The file data extent locations are represented by an embedded stream table (the file extents table 208), which is a table of offset mappings and optionally checksums. With this implementation, files and directories may be very large without a significant performance impact.

Other global data structures within the file system may be represented as tables that are rooted in the object table. For example, an Access Control List (ACL) may be rooted in the object table. Apart from global system metadata tables, the entries in the object table 205 may refer to directories where files are embedded within the directories.

In one implementation, tables may be implemented using B+ trees. In other implementations, tables may be implemented using other data structures.

In describing aspects of the subject matter described herein, for simplicity, terminology associated with relational databases is sometimes used herein. Although relational database terminology (e.g., a row) is sometimes used herein in describing the data structures used to store file system metadata, in alternative implementations, file system metadata mentioned herein may be stored in other data structures, such as, for example, object-oriented data structures, hierarchical data structures, network data structures, other types of data structures, some combination or extension of the above, and the like. Metadata for a file system may be organized in tables, records, objects, other data structures, and the like. The metadata for the file system may be stored in dedicated database files, dedicated hard drive partitions, HTML files, XML files, spreadsheets, flat files, document files, configuration files, other files, and the like.

As used herein, the term checksum includes any type of data that may be used to validate other data. A checksum may be used to verify that data has not become corrupted. A checksum may be simple or complex and may include information to detect different types of errors.

For example, a checksum such as a parity bit may be used to detect parity errors, while a more sophisticated checksum such as a cyclic redundancy check (CRC) may be used to detect error bursts of several bits. Some other checksums such as message authentication code (MAC), cryptographic hash functions, and some other function may be used to detect other data corruptions that may occur to data.

A checksum may be used in error detection or in error detection and correction. For example, a checksum may include data to detect errors but not to correct the errors. As another example, a checksum may include data to detect and correct certain types of errors.

The examples above are not intended to be all-inclusive or exhaustive of the types of checksums that may be used by aspects of the subject matter described herein. Indeed, based on the teachings herein, those skilled in the art may recognize other checksums that may be used without departing from the spirit or scope of aspects of the subject matter described herein.

Where tables are implemented with B+ trees, metadata may have checksums at the level of a B+ tree page. The checksum may be stored in the page or independently of the page. Having checksums allows detection of various forms of disk corruption, including, for example, lost and misdirected writes and bit rot (degradation of data on the media).

In addition, contents of files may be check-summed (e.g., associated with checksums that can be used to detect corruption) as well. When files are check-summed, the file system writes updates to files to a location different from the original one. This allocate-on-write technique ensures that pre-existing data is not lost due to the new write. The checksum update is done atomically with the data write, so that if power is lost during the write, a consistently verifiable version of the file is available whereby corruptions may be detected authoritatively.

Using the checksums, the file system may detect failures that involve media failure as well as failures that do not involve media failure such as, for example, failures that happen due to data corruptions or lost or misdirected writes. Where the file system is stored on a storage system having redundant copies, when the file system detects data corruption, the file system may communicate with the underlying storage system to correct the corruption. For example, the file system may communicate with the underlying storage system to read all available copies of data and choose the correct one based on checksum validation. The file system may then tell the underlying storage system to fix the bad copies based on the good copies. This communication may happen transparently from the point of view of a software application using the file system.

If the file system is not storing data on a storage system that has redundant copies, the file system may log an event indicating that corruption was detected and fail a read if it is for file data.

Checksums may default or be hard-wired to always be turned on for file system metadata. Furthermore, if the volume is hosted on a storage system having redundant copies or other redundant data (e.g., parity bits), automatic correction may also be turned on. This may be used to create an end-to-end high integrity solution, where relatively unreliable storage may be made highly reliable. For storage systems having redundant copies, checksums errors may be automatically corrected.

There may be cases when a file system is not implemented using a redundant underlying storage system or where the underlying redundant storage system is unable to correct corrupted data (e.g., data corrupted via hardware or firmware faults). In these cases, the file system may implement "salvage," a feature that removes the corrupt data from the namespace on a live volume. This feature attempts to ensure that non-repairable corruption does not adversely affect the availability of good data.

If, for example, a single file in a directory were to become corrupt and could not be automatically repaired, the file system can remove that file from the file system namespace while salvaging the rest of the volume. In appropriate implementations, this operation may be completed very quickly (e.g., less than a second).

In one implementation, the file system may store a copy of the boot block. This may be done, for example, to help recover from data corruption that affects the boot block.

File system based on previous technologies may be unable to open or delete a corrupt file. This poses difficult challenges for a system administrator. Aspects of the subject matter described herein, however, allow an administrator to respond to corruption. After the file system has removed corrupt data from the file system namespace, an administrator may recover corrupt file(s) from a backup or have the application re-create the file(s) without taking the file system offline. This may be done without executing an offline disk checking and correcting tool, and allows for very large data volumes to be deployed without risking large offline periods due to corruption.

Corruption of metadata of a file system may, for example, involve handling different types of data, including:
 1. Metadata that deals with directories;
 2. Metadata that deals with files; and
 3. Metadata that deals with security.

One method for dealing with corruption may include the following actions (not necessarily in order):
 1. Detect that corruption has occurred;
 2. Mark corrupted portion as bad;
 3. Obtain disk exclusive access at least to the portions that have been corrupted;

4. Repair/delete the metadata on disk that has been corrupted;

5. Repair/delete metadata in memory that is associated with the metadata on disk that has been corrupted.

6. Release the exclusive access previously obtained.

Some of the actions above may be deferred to a later time and triggered by access to a file system object (e.g., a directory, file, security object, or the like). For example, namespace entries may be deleted after exclusive access is obtained. After exclusive access is released, other actions may occur to reconstruct namespace entries. These actions may be triggered by an event (e.g., attempted access to a file system object) or be taken by a repair process that does not need exclusive access.

In one implementation, detecting that corruption has occurred may occur when a block that includes the corrupted data is read. When the block is read, a checksum for the block may be computed and compared against a checksum previously computed for and associated with the block. If the checksums are not equal, corruption may be detected.

In another implementation, detecting that corruption has occurred may occur after the checksums have been compared and found to be equal. In this implementation, even though the checksums are equal, the data may not make sense (e.g., it may not follow a predefined syntax).

Handling Directory Corruption

Figure 3:
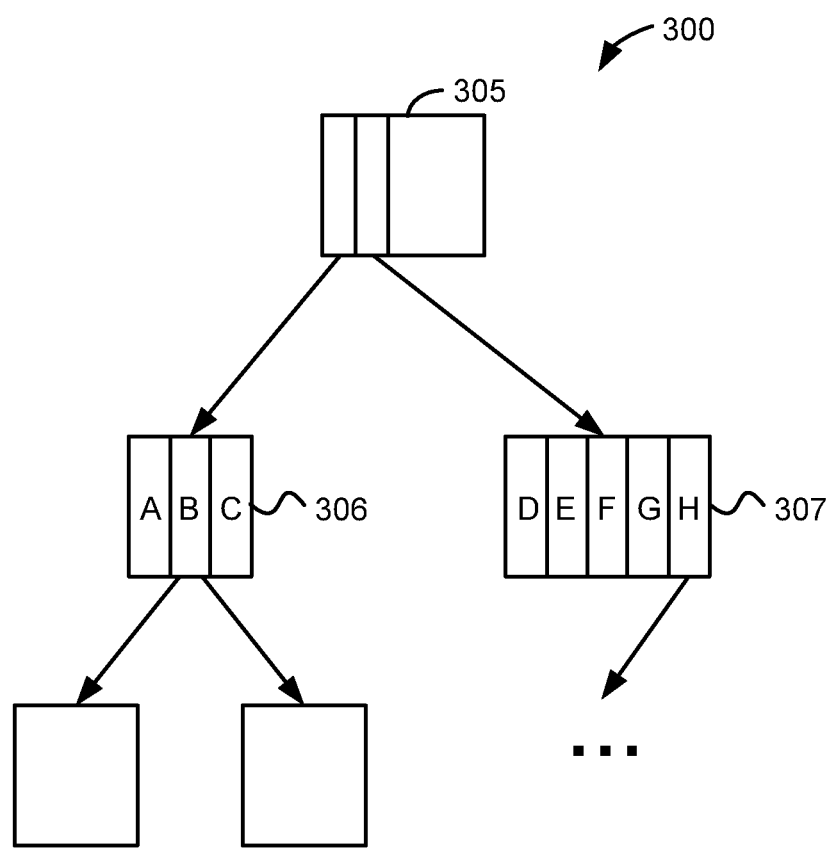
FIG. 3 is a block diagram that generally represents a portion of an exemplary data structure that may be used for file system metadata in accordance with aspects of the subject matter described herein.

FIG. 3 is a block diagram that generally represents a portion of an exemplary data structure that may be used for file system metadata in accordance with aspects of the subject matter described herein. The data structure 300 may include nodes that include metadata or other data structure information (e.g., hierarchical or other relationship data). Some nodes (e.g., the nodes 305-307) are illustrated but there may be many other nodes.

Each node may include several entries. Each entry may include data that may be used to represent file system metadata. An entry may include checksum data that is to be used to verify that data has not become corrupted. For example, entries in the node 305 may include pointers to the nodes 306 and 307 as well as checksum data for the node 306 and checksum data for the node 307.

When reading data for the node 306 or at other times, a checksum may be computed from the data and compared with the checksum data included in the node 305. If the checksums do not match, corruption may be detected.

The node 306 may include three entries, for example. Each entry may include file system metadata regarding file system objects of a file system. The node 307 may include 5 entries, for example. The entries D-G may include file system metadata regarding files of the file system while the entry H may include file system metadata regarding a subdirectory of the node 307. The entry H may point to another node that includes file system metadata for the subdirectory. Hereinafter, the term "metadata" is sometimes used as a shortened phrase for file system metadata.

If an entry does not have enough space to store all the metadata regarding file system object, the entry may point to additional nodes that store the metadata. For example, the file B in the node 306 requires additional metadata that is represented by the nodes pointed to by the entry for B.

In one implementation, each subdirectory of the data structure 300 may be represented by a node that may be logically implemented as a tree data structure to represent the metadata of the subdirectory.

In one implementation, the entries may be sorted by name as illustrated in FIG. 3. In other implementations, the entries may be sorted by other characteristics.

As indicated previously, data corruption may be detected by comparing checksums. If the data in node 306 becomes corrupted, the metadata included in the node 306 may be considered unreliable and unusable. In one implementation, the file system may treat this corruption by deleting the entry in the node 305 that refers to the node 306. In conjunction with deleting the entry, the file system may also delete any in-memory data structures that refer to file system objects represented by the node 306.

Deleting the entry that refers to the node 306 has the result of deleting the metadata of the files 306 from the data structure 306. This has the result of making the files inaccessible using the data structure 300 (e.g., the namespace of the file system). The files may still have data that resides on disk, but this data is no longer reachable via the data structure 300.

To aid in describing what happens with directory corruption, an example that includes a sequence of events is described below. This example is not intended to be all-inclusive or exhaustive of all the events that might occur or indicative of events that are required to occur. Rather, it is intended to provide a concrete example of events that may occur and how the file system may respond to those events.

An application may seek to open or otherwise operate on a file system object. In reading metadata structures to perform the operation, the file system may determine that corruption has occurred. For example, in reading the node 306 to get information about the file A, the file system may compute a checksum and compare it to the checksum included in the node 305 and find that the checksums are not equal.

In one implementation, when this occurs, a corruption object is created. The corruption object may include data that may be used later to find the data corruption. In one example, the corruption object may indicate the operation that was being performed and the file system object upon which the operation was to take effect. For example, the corruption object may indicate that when attempting to open file A, corruption was detected. In addition, the file system may mark the corrupted node as contained corrupt data.

Afterwards, the file system may initiate actions to attempt to repair the file system namespace. Using the corruption object, the file system may attempt to open the file system object again. In doing so, the file system may first lock the entire volume. In one embodiment, a volume lock may allow other processes to read or write to objects for which they currently hold handles, but may not allow other processes to create new files or obtaining new opens for the volume.

In another embodiment, a volume lock may, for example, disallow one or more of: opening, creating files, deleting files, closing files, dismounting a volume, and obtaining exclusive access to the volume. A volume lock may, for example, allow one or more of: reading, writing, querying or modifying attributes, and renaming of individual files In addition, the file system may obtain exclusive locks for directories and files associated with the affected corrupted metadata. In one embodiment, a directory lock may, for example, disallow one or more of: opening or creating files in the directory (including immediate child files), renaming files into or out of the directory, deleting files within the directory, modifying or querying attributes of the directory itself, and the like. A directory lock may, for example, allow one or more of: reads or writes to individual files within the directory, opens, creates, and deletes of subdirectories of the locked directory.

In one embodiment, a file exclusive lock may, for example, disallow one or more of: reading or writing to data to the file, opening the file, deleting the file, renaming the file, closing the file, and the like. An exclusive lock may, for example, allow no access to the file.

The examples of lock behaviors above are exemplary and are not intended to be all-inclusive, exhaustive, or required in every implementation. Based on file system implementation different locks that perform the same function (e.g., locking the corrupted metadata while allowing access to non-corrupted metadata) may be used without departing from the spirit or scope of aspects of the subject matter described herein.

The file system may then begin navigating the data structure 300 to determine which node includes corrupt data. In this example, the node 306 is determined to include corrupt data. After determining that node 306 includes corrupt data, the range of the parent directory affected by the corruption may be determined. In this example, the range is from A to C. The range may be determined by examining the difference between an entry and its neighboring entry.

For example, the first entry may include a "C" and the second entry may include an "I". The first entry points to the corrupted node, so the file system may then determine that any files with a name C or less are affected by the corruption.

After determining the range, the file system may exclusively lock the namespace affected by the corruption and examine its data structures to determine any file system objects within the range that are currently open. The file system marks the file system objects (e.g., directories and files) found within the range as deleted. Throughout this document, the term file is sometimes used, but it is to be understood that when this term is used, in another embodiment, as appropriate, the term directory may be substituted for the term file.

After a file system object is marked as deleted, subsequent requests to open the file system object fail. In addition, the memory associated with the file system object may be freed or marked to be freed so that it may be used for other purposes.

After the above is done, the file system may explicitly flush the changes to disk or may allow writing to disk to happen in its normal course. The file system may also release the exclusive locks.

Figure 4:
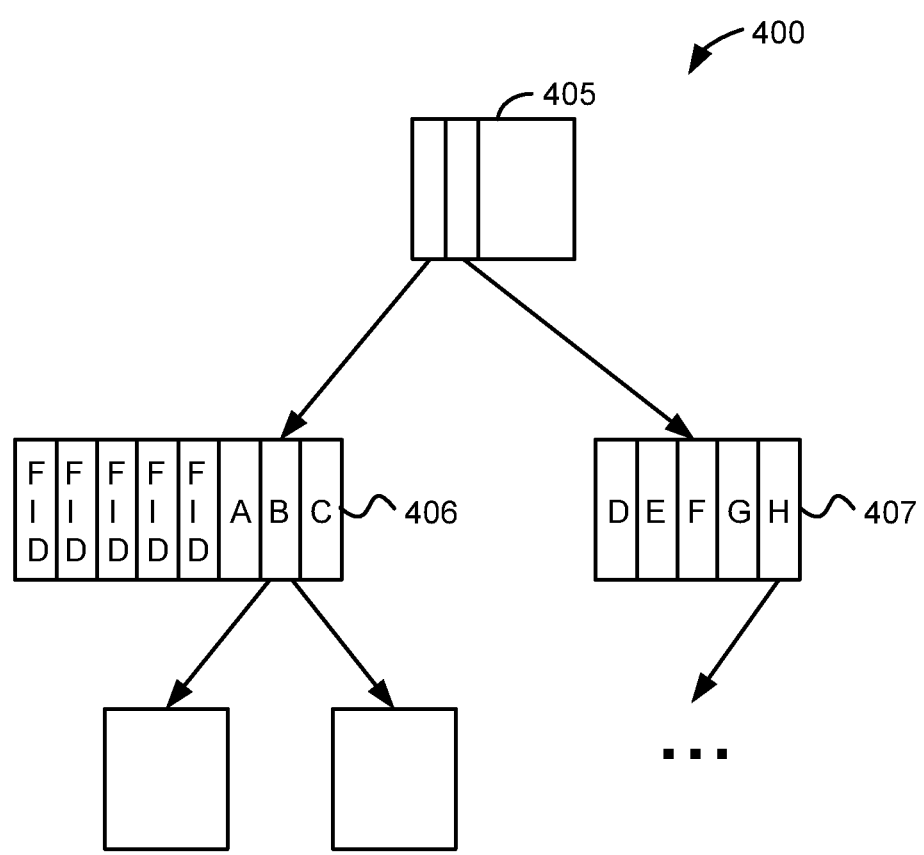
FIG. 4 is a block diagram that generally represents a portion of another exemplary data structure that may be used for file system metadata in accordance with aspects of the subject matter described herein.

In addition to a name that refers to a file, some file systems may support a file identifier that also refers to the file. FIG. 4 is a block diagram that generally represents a portion of another exemplary data structure that may be used for file system metadata in accordance with aspects of the subject matter described herein. The data structure 400 illustrated in FIG. 4 is similar to that in FIG. 3 except that file identifiers (file IDs) as shown at the left of the node 406. In one implementation, file identifiers, if they exist, may always be found at the far left of the data structure 400.

A file identifier is another way that a process may refer to a file. A file identifier may be stored as an entry in a node (e.g., represented by FID in the node 406) and may include the file identifier (e.g., a number or other data) together with a file name associated with the file identifier. These file identifier entries map file identifiers to file names. A file may be opened by name or by file identifier.

The repair operations that occur if a node that includes file identifiers is corrupted may be different than the repair operations that occur if a node that does not include file identifiers is corrupted. In particular, if the node 406 is detected as corrupted, the metadata for the files A, B, and C is deleted as described previously, but afterwards, the data from the remaining intact entries in node 407 are used to recreate the file IDs of the node 406.

On the other hand, if the node 407 is detected as corrupted, the node 407's metadata is deleted and repair operations are deferred for the file IDs of the node 406 that reference the files that have been deleted of the node 407. In particular, after the deletion occurs, when a file ID is received in an I/O operation, if the file ID refers to a file that no longer exists, the file ID is also deleted.

If after deleting a file in response to corruption, a new file having the same name has been created, a preexisting file ID that pointed to the deleted file may now point to the new file. This is an error and may be detected by metadata in the file entries. This metadata for a file entry maps back to the file ID associated with the file. When opening a file by its file ID, the file ID is compared with the file ID in the file metadata. If they are not the same, the file ID entry is deleted.

A file ID may be used to open a file even if the file has been moved to another directory. To do this, a file ID entry may include information that maps an identifier to a directory and a file in the directory to which the file has been moved. For example, each directory may be assigned a number and this number may be included in the file ID entry to locate the directory to which a file has been moved.

For example, a file ID entry may include a directory identifier (e.g., 600), and a file identifier (e.g., 5) that is associated with the file E. If E is renamed to another directory, the directory identifier may be changed to the identifier (e.g., 605) of the other directory while keeping the file identifier the same. In this way, the file ID may be used to locate a file even when the file has been moved to a new directory.

If this occurs and the file IDs are corrupted (e.g., the node 406), E may become inaccessible via file identifier. Furthermore, E may not be reconstructed after scanning the remaining non-corrupt metadata (e.g., node 407) because E has been moved from the directory. In this case, there are two options: 1. Scan all directories to see if E exists anywhere and if so, reconstruct the file ID; or 2. Defer reconstructing the file ID for E to when E is moved. Because of the I/O expense in option 1, option 2 may be the default in one implementation. Those skilled in the art will recognize in this behavior, the file system recognizes that an inconsistent state may exist and allows operations to continue without requiring that consistency to be restored.

Handling File Corruption

File as used in this section refers to a file and not to a directory. A file metadata corruption may be detected in a similar manner as a directory metadata corruption is detected. In particular, while accessing any metadata about a file, a computed checksum may not equal a previously stored checksum. In that case a corruption object may be created that indicates, for example:

1. The specific directory in which the file resides;
2. An identifier of the file (e.g., the file name);
3. The row within the file table;
4. The row within the stream table (e.g., the extents table).

After the corruption is detected and the corruption object created, the file system may enter a repair phase. In the repair phase, the file system may obtain an exclusive lock on all metadata corresponding to the file and may delete the metadata. In one implementation, obtaining this exclusive lock may include obtaining a volume exclusive lock, a directory exclusive lock of the parent directory of the file, and an exclusive lock of the file itself.

In one implementation, the file system may remove the entry from the directory metadata that points to the file. In file systems that implement file IDs, the file system may also remove any file ID rows from the directory metadata that map to the file. Performing the above removes from the file system namespace record(s) of the file's existence.

After or in conjunction with deleting the metadata on disk, the file system may perform actions with respect to data about the file that is currently in memory. In particular, the file system may free or mark for freeing data structures in memory that are associated with the file.

After the above is done, the file system may explicitly flush the changes to disk or may allow writing to disk to happen in its normal course. The file system may also release the exclusive lock.

Handling Security Data Corruption

Figure 5:
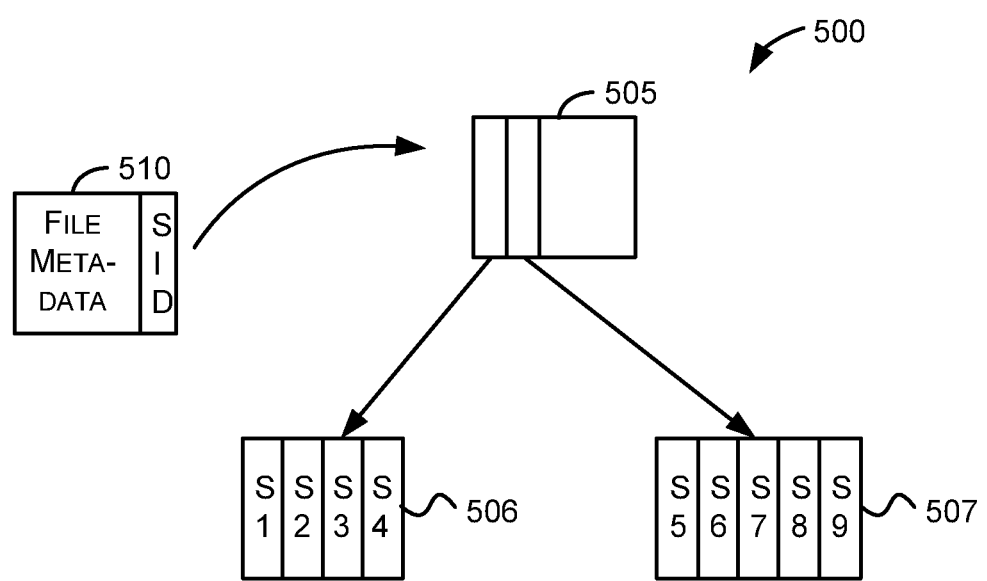
FIG. 5 is a block diagram that generally represents a portion of an exemplary data structure that may be used for file system security metadata in accordance with aspects of the subject matter described herein.

FIG. 5 is a block diagram that generally represents a portion of an exemplary data structure that may be used for file system security metadata in accordance with aspects of the subject matter described herein. As illustrated in FIG. 5, the security data structure 505 may, in one example, include a root node 505 and two nodes (e.g., nodes 506 and 507) that descend from the root node.

In one implementation, the file metadata 519 may include a security identifier (security ID) that may be used to locate security information in the data structure 500 that pertains to the file. The security information may indicate, for example, entities that are allowed to access the file and what access rights those entities have.

When a file operation is received, the file system may use the security ID associated with the file metadata to locate the security information in the data structure 505. In conjunction with reading a node of the data structure 505, the file system may compute a checksum and compare the checksum with a checksum previously computed for the node. If the checksums are not equal, corruption may be detected.

After corruption is detected, the file system may then enter a repair phase. In the repair phase, the file system may obtain an exclusive lock on the affected security metadata and delete the offending node by deleting a reference to the node from the parent of the node. In one implementation, obtaining an exclusive lock for corrupted security metadata may include obtaining a volume exclusive lock and a security stream (e.g., the extents that include the corrupted security data). These locks may prevent new opens and new additions to the security table while the corrupted metadata is being deleted. Note, this implementation may not need directory or file exclusive locks to delete corrupted security metadata.

For example, referring to FIG. 5, if block 506 is detected as corrupted, the file system may take an exclusive lock on the blocks associated with the nodes 505 and 506 and then clear the entry in node 505 that points to the block 506 so that is no longer points to the block 506.

In the case of security, in one implementation, no further cleanup action is taken with in-memory data structures. The file system may assume that any processes that have valid security objects that allow them to access a file system object are still valid, even if those objects have security derived from one of the deleted security entries of the data structure 500. After the file system has cleared the entry in the parent of the node that has become corrupted, the file system may then release the locks on the nodes.

The file system may receive a file I/O request for a file having a security ID that maps to a deleted portion of the data structure 500. In this case, after attempting to find the security ID in the data structure 505 and not finding it, the file system may provide access to the file based on hard-coded or configuration settings. In one example, the file system may only allow a privileged user such as a system administrator or the like to access the file. In another example, the file system may allow a set of users that have been indicated by the configuration settings to access the file.

In one implementation, the file system may leave the file metadata security ID unchanged after an attempted access. In another implementation, when the file system receives an access request for a file for which the security information has been deleted, the file system may create or use an existing security identifier for the file and may place the security identifier in the file metadata. The new or existing security ID to place in the file metadata may be governed by hard-coded rules or configuration settings depending on implementation.

Errors not Detected by Checksums

As mentioned previously, it is possible that although the checksums are equal that data may not make sense. Not making sense may include not following a syntax, values being outside of predefined ranges, values that indicate that a file overlaps another file, data that points to data that no longer exists, other errors, or the like. There are many reasons why this may occur but they are not pertinent to the discussion here.

An example of this has been described above with respect to file IDs. When file metadata becomes corrupted, it may be deleted and the file IDs that point to the file metadata may remain. Later, when a process attempts to access a deleted file using the file ID, when the file system attempts to locate the file using the file ID, the file system is unable to locate the file. At this point, the file system has detected a problem and may generate a corruption object that specifically identifies the corrupted metadata.

Then, in the repair phase, the file system may obtain locks on the affected portion of the namespace and may perform repair operations as appropriate. In the case of a file ID, the file ID entry is deleted from the namespace metadata. In the case of an entry of a directory namespace being corrupted, the entry may be deleted and in-memory data structures associated with the entry cleaned up as previously mentioned. In the case of a security metadata entry being corrupted, the entry for the security metadata may be deleted.

The metadata deleted and repaired when errors are detected other than by checksum may be more specific than when errors are detected by checksum. For example, referring to FIG. 3, when an error is detected by checksum in the node 306, the entire node 306 may be deleted whereas when an error is detected not by checksum in the file B of the node 306, only the entry for the file B in the node 306 is deleted. Similarly, referring to FIG. 4, when an error is detected in the node 406, the entire node 406 is deleted whereas when an error is detected in one of the file IDs of the node 406, then just that file ID may be deleted by deleting the entry that includes the file ID.

Exemplary Environment

Figure 6:
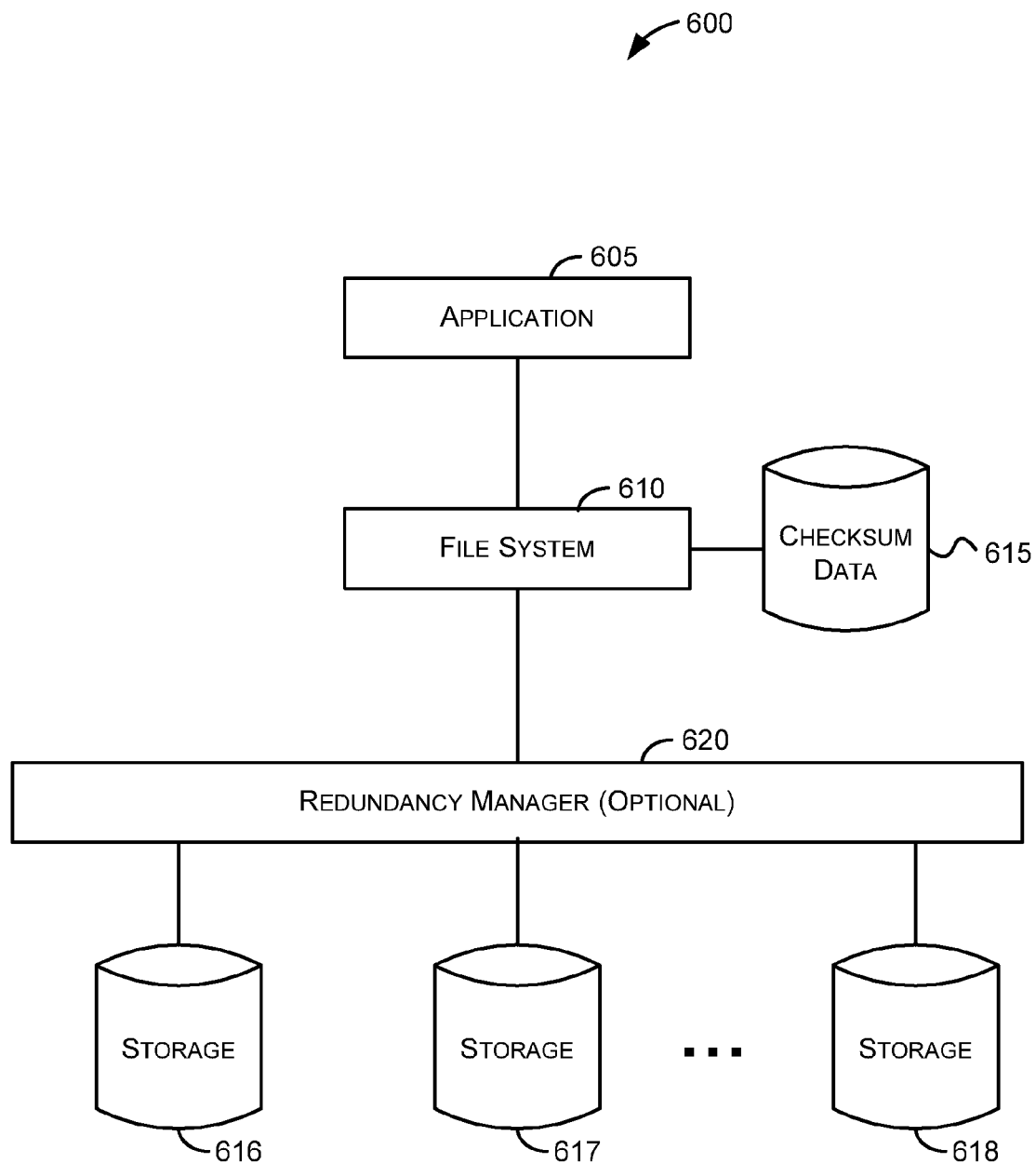
FIG. 6 is a block diagram that represents another exemplary environment in which aspects of the subject matter may be incorporated.

FIG. 6 is a block diagram that represents another exemplary environment in which aspects of the subject matter may be incorporated. The environment 600 may include, for example, entities 605, 610, 615-618, and 620. A single one of these entities is sometimes referred to as a component while two or more of these entities are sometimes referred to as components.

The components illustrated in FIG. 6 are exemplary and are not meant to be all-inclusive of components that may be needed or included. Furthermore, the number of storage components may differ in other embodiments without departing from the spirit or scope of aspects of the subject matter described herein. In some embodiments, the components described in conjunction with FIG. 6 may be included in other components (shown or not shown) or placed in subcomponents without departing from the spirit or scope of aspects of the subject matter described herein. In some embodiments, the components and/or functions described in conjunction with FIG. 6 may be distributed across multiple devices.

As used herein, the term component is to be read to include hardware such as all or a portion of a device, a collection of one or more software modules or portions thereof, some combination of one or more software modules or portions thereof and one or more devices or portions thereof, and the like.

For example, the components illustrated in FIG. 6 may be implemented using one or more computing devices. Such devices may include, for example, personal computers, server computers, hand-held or laptop devices, multiprocessor systems, microcontroller-based systems, set-top boxes, programmable consumer electronics, network PCs, mini-computers, mainframe computers, cell phones, personal digital assistants (PDAs), gaming devices, printers, appliances including set-top, media center, or other appliances, automobile-embedded or attached computing devices, other mobile devices, distributed computing environments that include any of the above systems or devices, and the like.

An exemplary device that may be configured to implement one or more of the components of FIG. 6 comprises the computer 110 of FIG. 1.

A component may also include or be represented by code. Code includes instructions that indicate actions a computer is to take. Code may also include information other than actions the computer is to take such as data, resources, variables, definitions, relationships, associations, and the like.

Code may be executed by a computer. When code is executed by a computer, this may be called a process. The term "process" and its variants as used herein may include one or more traditional processes, threads, components, libraries, objects that perform tasks, and the like. A process may be implemented in hardware, software, or a combination of hardware and software. In an embodiment, a process is any mechanism, however called, capable of or used in performing an action. A process may be distributed over multiple devices or a single device. An application (e.g., the application 605) may execute in user mode, kernel mode, some other mode, a combination of the above, or the like. The application 605 may execute as part of the storage system or outside (i.e., not as part) of the storage system.

The stores 615-618 may include any storage media capable of storing data. A store may include volatile memory (e.g., RAM or other volatile memory described previously) and/or non-volatile memory (e.g., hard drives or other non-volatile memory described previously). A store may be located entirely on one device or may be distributed across multiple devices. A store may be external, internal, or include components that are both internal and external to a storage system hosting the store.

The term data is to be read broadly to include anything that may be represented by one or more computer storage elements. Logically, data may be represented as a series of 1's and 0's in volatile or non-volatile memory. In computers that have a non-binary storage medium, data may be represented according to the capabilities of the storage medium. Data may be organized into different types of data structures including simple data types such as numbers, letters, and the like, hierarchical, linked, or other related data types, data structures that include multiple other data structures or simple data types, and the like. Some examples of data include information, program code, program state, program data, other data, and the like.

In some implementations, the store 615 may be hosted on a storage system that hosts the stores 616-618. In other implementations, the stores 615 may potentially be hosted on a storage system separate from the storage system that hosts the stores 616-618. The number of stores illustrated in FIG. 6 is exemplary only. In other embodiments, there may be more or fewer stores.

The application 605 may communicate with the file system 610 to access data on the stores 616-618. Access as used herein may include reading data, writing data, deleting data, updating data, a combination including two or more of the above, and the like.

The file system 610 may be responsible for persisting data to and retrieving data from non-volatile storage (e.g., the stores 616-618) via the redundancy manager 620. When the file system 610 receives a read request, the file system 610 may communicate with the redundancy manager 620 to obtain the requested data from one or more of the stores 616-618. After the redundancy manager 620 has provided the data to the file system 610, the file system 610 may provide the data to the requesting entity (e.g., the application 605).

The redundancy manager 620 may be responsible for storing one or more copies of data on the stores 616-618. For example, the redundancy manager 620 may mirror data of one store onto one or more other stores. As another example, the redundancy manager 620 may store multiple logical copies of the data by using standard or proprietary Redundant Array of Independent Disks (RAID) techniques known to those skilled in the art. The term "logical" is used to indicate that data (e.g., parity or other data) less than a complete physical copy may be stored on the other stores in a way that a complete copy can be created from this data if a physical copy becomes corrupted.

The file system 610 and/or the redundancy manager 620 may detect and correct some errors in the data from the stores 616-618 prior to providing the data to the application 605. For example, the file system 610 or the redundancy manager 620 may store checksum data that may be used to detect and correct some types of data errors on the stores 616-618. If the file system 610 and/or the redundancy manager 620 detect an error that can be corrected by stored checksum data, the error may be corrected without informing the application 605.

In some implementations, the redundancy manager 620 may be implemented as a component of the file system 610. In other implementations, the redundancy manager 620 may be implemented as one or more components separate from the file system 610. The file system 610, the redundancy manager 620, and any storage devices used by the file system 610 and the redundancy manager 620 are sometimes referred to herein as a storage system. A storage system may include any components needed to persist and provide access to data.

If the file system 610 determines via the checksum that the data from the file system 610 is corrupted, the file system 610 may attempt to obtain non-corrupted data from a redundant copy of the data if available. If one or more copies of the data are stored on the stores 616-618, the file system 610 may request the data of each copy and may use the checksum to determine if any of the copies contain non-corrupted data. In response, the redundancy manager 620, may provide each copy as requested to the file system 610.

If a copy contains non-corrupted data, the file system 610 may indicate that the copy is to be used to correct the corrupted original data. If a copy contains non-corrupted data and one or more other copies contain corrupted data, the file system 610 may also indicate that the copy containing the non-corrupted data be used to correct the one or more copies with corrupted data.

The chunk of data corresponding to a checksum may vary in different implementations. For example, in one embodiment, the size of a chunk of data corresponding to a checksum may be 4 kilobytes. In another embodiment, the size of a chunk of data corresponding to a checksum may be 64 kilobytes. In yet another embodiment, the size of a chunk of data corresponding to a checksum may be the size of the file. The above sizes of data are exemplary only. In other embodiments, the size of chunk of data corresponding to a checksum may be smaller or larger than the sizes indicated above.

In one embodiment, the redundancy manager 620 may be omitted or only store one copy of each file on the stores 616-618. In this embodiment, when file system metadata becomes corrupted, there may be no copies from which non-corrupted metadata may be obtained. Furthermore, even when the redundancy manager 620 stores redundant copies of data, it may be that all copies also include corrupted data. In both of the cases above as well as in cases where it is appropriately configured, the file system 610 may take the actions previously indicated where the corrupted metadata is deleted without an attempt to replace the corrupted metadata with a redundant copy of the metadata.

Figure 7:
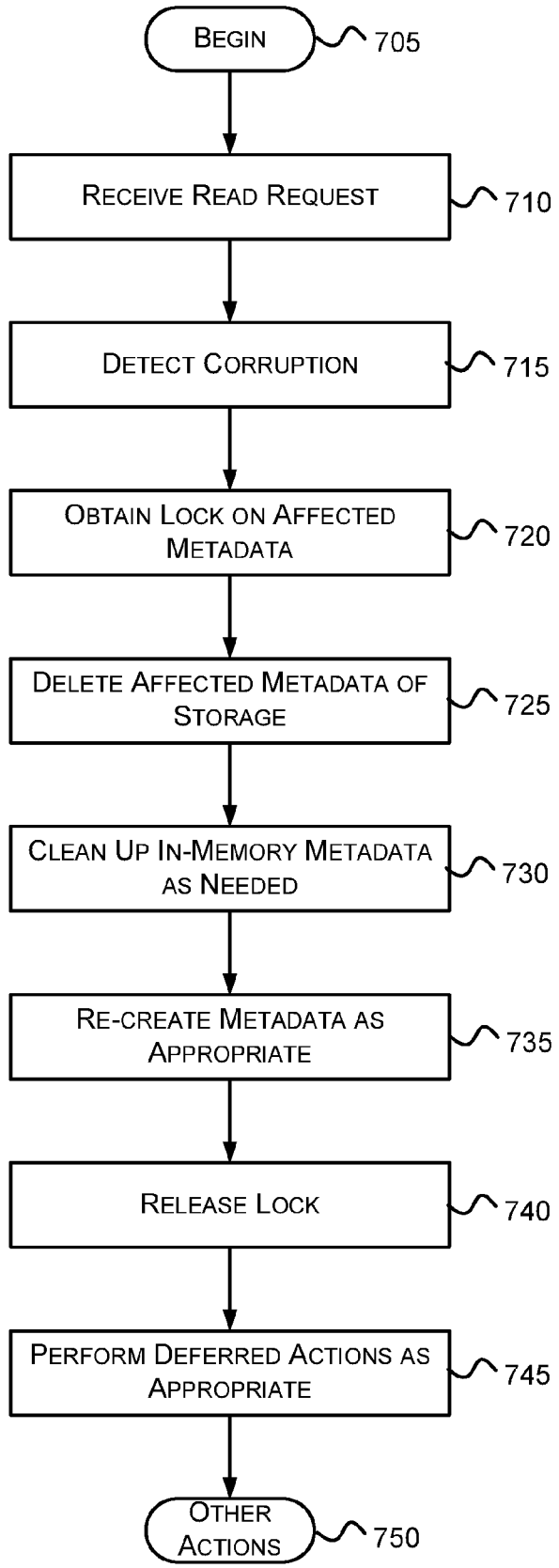
FIG. 7 is a flow diagram that generally represents exemplary actions that a file system may perform in accordance with aspects of the subject matter described herein.
Figure 8:
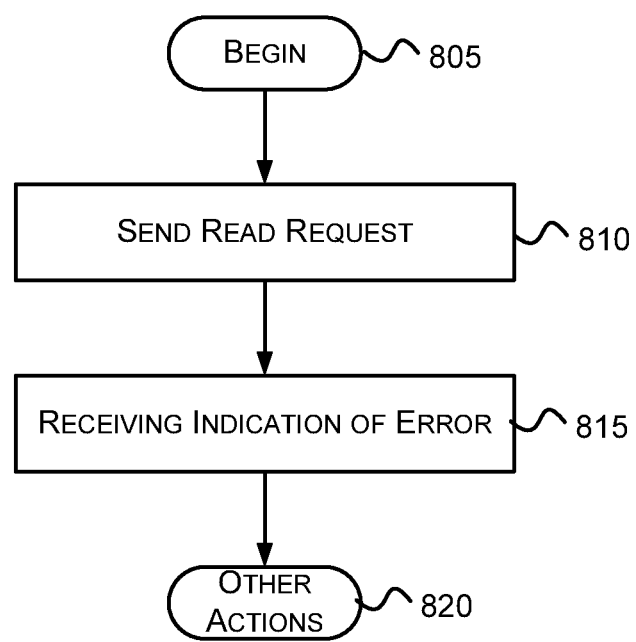
FIG. 8 is a flow diagram that generally represents exemplary actions that an application may perform in accordance with aspects of the subject matter described herein.

FIGS. 7-8 are flow diagrams that generally represent exemplary actions that may occur in accordance with aspects of the subject matter described herein. For simplicity of explanation, the methodology described in conjunction with FIGS. 7-8 is depicted and described as a series of acts. It is to be understood and appreciated that aspects of the subject matter described herein are not limited by the acts illustrated and/or by the order of acts. In one embodiment, the acts occur in an order as described below. In other embodiments, however, the acts may occur in parallel, in another order, and/or with other acts not presented and described herein. Furthermore, not all illustrated acts may be required to implement the methodology in accordance with aspects of the subject matter described herein. In addition, those skilled in the art will understand and appreciate that the methodology could alternatively be represented as a series of interrelated states via a state diagram or as events.

In one implementation, the file system 610 may include a component sometimes called herein a file identifier manager. The file system manager may be implemented as code that includes additional instructions for how to handle corruptions that affect file system identifiers. The file identifier manager may perform actions, including, for example:

1. Determining that the file identifiers have become corrupted; and

2. Recreating a new set of file identifiers based on file metadata that has not been corrupted. The file metadata was referred to by the file identifiers prior to the file system metadata becoming corrupted.

The file identifier manager may also defer some repair actions until later. For example, the file identifier manager may defer until subsequent access deletion of file identifiers that are not corrupt but that reference files that have been deleted in the deleting the corrupted portion of the file system metadata.

The file identifier manager may also perform other actions related to file identifiers that have been described previously.

FIG. 7 is a flow diagram that generally represents exemplary actions that a file system may perform in accordance with aspects of the subject matter described herein. At block 705, the actions begin.

At block 710, a read request is received. For example, referring to FIG. 6, the file system 610 receives a read request from the application 605 for data stored in the storage system. In one implementation, the read request may come (e.g., be initiated by) from a non-repair process. A non-repair process is a process that is not specifically programmed to repair file system metadata errors. Examples of non-repair processes may include word processing applications, spreadsheet applications, other user applications, e-mail applications, and the like.

In another implementation, the read request may come from a process that seeks to repair any errors on the file system. For example, the read request may come from a scrubber repair process that reads data from the store with the goal of fixing corrupt data.

At block 715, corruption is detected. For example, referring to FIG. 6, the file system 610 obtains a checksum from the store 615 and compares the checksum against a checksum computed when reading file system metadata. If the checksums are not equal, corruption is detected in the metadata of a volume of the file system.

At block 720, an exclusive lock is obtained to a file system structure that includes the corrupted metadata while allowing access to a non-corrupted portion of the metadata. Obtaining an exclusive lock may include obtaining one or more locks on file system objects. For example, referring to FIG. 3, if the corruption occurs to the metadata in node 307, and exclusive lock is obtained to file system structures corresponding to the node 307. In one embodiment, if corruption occurs to a directory, then obtaining an exclusive lock may include:

Obtaining, by a repair process, one or more locks that prevent non-repair processes at least from opening files and directories in the corrupted directory and all subdirectories that descend from the corrupted directory but that allow the non-repair processes to access directories and files that are outside of the corrupted directory and its descendants.

In another embodiment, if corruption occurs to a directory, then obtaining an exclusive lock may include:

1. Obtaining, by a repair process, a volume exclusive lock on the volume. The volume exclusive lock disallows all non-repair processes (e.g., any process that does not hold the volume exclusive lock) from at least creating a file system object on the volume while the volume exclusive lock is maintained. The volume exclusive lock allows the non-repair processes to at least write to file system objects of the volume while the volume exclusive lock is maintained.

2. For directory metadata that is in memory, obtaining directory exclusive locks for the directory metadata. The directory metadata includes directory metadata of the corrupted directory and subdirectory metadata for subdirectories that are descendants of the corrupted directory. The directory exclusive locks disallow the non-repair processes from at least creating a new file system object in any of the directories while the directory exclusive lock is maintained. The directory exclusive locks allow the non-repair processes to at least write to files that are descendants of the corrupted directory.

3. For file metadata that is in memory, obtaining file exclusive locks for files that are descendants of the corrupted directory. The file exclusive locks allow the non-repair processes to access file system objects that are not descendants of the corrupted directory. The file exclusive locks disallow the non-repair processes to access any file that is a descendant of the corrupted directory where the file has file metadata that is in memory.

In another embodiment, if the corruption occurs in a file, then obtaining an exclusive lock may include, for example, obtaining, by a repair process, a lock that prevents non-repair processes from accessing the file but that does not prevent the non-repair processes from accessing directories or other files.

In another embodiment, if the corruption occurs to security data, then obtaining an exclusive lock may include, for example, allowing processes that have obtained access to file system objects that correspond to the corrupted portion of the metadata to continue to access the file system objects.

At block 725, the corrupted portion of the metadata is a deleted from the non-volatile storage of the file system. For example, referring to FIGS. 3 and 6, the file system 610 may delete data from the stores 616-618 that corresponds to the corrupted metadata. In one implementation, this may involve deleting an entry from a table that refers to the corrupted metadata. For example, referring to FIG. 3, this may involve deleting the entry from the node 305 that refers to the metadata included in the block 307. Doing this deletes a corrupted directory and all descendants thereof from a namespace of a file system. Portions of the deleted metadata may still reside on disk, but these portions are no longer accessible via the namespace metadata.

At block 730, in-memory metadata is cleaned up as needed. For example, referring to FIG. 6, the file system 610 may delete any in-memory data structures it has that correspond to the corrupted metadata. For a directory that has been corrupted, this cleanup may include, for example, freeing or marking for freeing data structures that are in memory and that are maintained for access to data of file system objects that are descendants of the corrupted directory.

For a file that has been corrupted, this cleanup may include, for example, freeing or marking for freeing data structures that are in memory that are maintained for access to data of the file. This deletes metadata that indicates the existence of the corrupted file so that the file is no longer reachable via the file system namespace.

At block 735, metadata is re-created as appropriate. For example, referring to FIGS. 4 and 6, the file system 610 may recreate the file IDs of the node 406 from the metadata 407. Recreating file identifiers may include scanning the non-corrupted file metadata and creating a file identifier for each non-corrupted file metadata.

At block 740, the exclusive lock is released. For example, referring to FIG. 6, the file system 610 may release any exclusive lock obtained.

At block 745, deferred repair actions are performed as appropriate. For example, if later the file system receives a read operation using a file system ID where the file system ID is not corrupted, but the file to which the file system ID refers has been corrupted and deleted, then the file system may delete the file system ID when it receives the read operations and may fail the operation. As another example, processes that have obtained access to file system objects that correspond to the corrupted security data that has been deleted may continue to access the file system objects. As another example, if the file system later receives a request for a file system file system object for which security data has been deleted, the file system may respond by creating new security data for the file system object. The new security data access to the file system object to an administrator, a predefined group of entities, a configurable set of users, or the like.

At block 750, other actions, if any, may be performed.

FIG. 8 is a flow diagram that generally represents exemplary actions that an application may perform in accordance with aspects of the subject matter described herein. At block 805, the actions begin.

At block 810, an application may send a read request to access a file system object of a file system. For example, referring to FIG. 6, the application may send a read request to the file system 610.

At block 815, the application may receive a response that indicates that an error has occurred. For example, referring to FIG. 6, the application 605 may receive a response that indicates that the read has failed, that the file system object is not accessible, or the like.

At block 820, other actions, if any, may be performed.

As can be seen from the foregoing detailed description, aspects have been described related to file system technology. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A method implemented at least in part by a computer, the method comprising:
   in response to a read initiated by a non-repair process, detecting that corruption has occurred in a corrupted portion of metadata of a volume of a file system;
   obtaining an exclusive lock to a file system structure that includes the corrupted portion of the metadata, the exclusive lock allowing other processes to access non-corrupted portions of the metadata;
   deleting the corrupted portion of the metadata on non-volatile storage while the exclusive lock is maintained without replacing the corrupted portion with a redundant copy of the metadata in conjunction with the deleting the corrupted portion;
   determining that the corrupted portion of the metadata is not security data used for security of the file system, security data comprising security information indicating an entity that is allowed to access a file of the volume of the file system, in response to the determining, deleting data structures in memory corresponding to the corrupted portion of the metadata deleted from the non-volatile storage;
   and releasing the exclusive lock.

2. The method of claim 1, wherein if the corruption occurred in a corrupted directory, then the obtaining an exclusive lock comprises:
   obtaining, by a repair process, a volume exclusive lock on the volume, the volume exclusive lock disallowing all non-repair processes from at least creating a file system object on the volume while the volume exclusive lock is maintained, the volume exclusive lock allowing the non-repair processes to at least write to file system objects of the volume while the volume exclusive lock is maintained;
   for directory metadata that is in memory, obtaining directory exclusive locks for the directory metadata, the directory metadata including directory metadata of the corrupted directory and subdirectory metadata for subdirectories that are descendants of the corrupted directory, the directory exclusive locks disallowing the non-repair processes from at least creating a new file system object in any of the directories while the directory exclusive lock is maintained, the directory exclusive locks allowing the non-repair processes to at least write to files that are descendants of the corrupted directory; and for file metadata that is in memory, obtaining file exclusive locks for files that are descendants of the corrupted directory, the file exclusive locks allowing the non-repair processes to access file system objects that are not descendants of the corrupted directory, the file exclusive locks disallowing the non-repair processes to access any file that is a descendant of the corrupted directory where the file has file metadata that is in memory.

3. The method of claim 2, wherein deleting the corrupted portion of the metadata on non-volatile storage comprises deleting an entry in a table, the entry in the table referring to the corrupted directory such that the corrupted directory deleted in a namespace of the file system.

4. The method of claim 2, wherein deleting data structures in memory comprises freeing or marking for freeing data structures that are in memory and that are maintained for access to data of file system objects that are descendants of the corrupted directory.

5. The method of claim 2, further comprising recreating file identifiers if directory metadata that includes the file identifiers has been corrupted but file metadata referenced by the file identifiers has not become corrupted, the recreating the file identifiers comprising scanning the non-corrupted file metadata and creating a file identifier for each non-corrupted file metadata.

6. The method of claim 2, further comprising deferring until subsequent access deletion of file identifiers that are not corrupt but that reference files that have been deleted in the deleting the corrupted portion of the metadata.

7. The method of claim 1, wherein if the corruption has occurred in a corrupted directory, then the obtaining an exclusive lock comprises obtaining, by a repair process, one or more locks that prevent non-repair processes at least from opening files and directories in the corrupted directory and all subdirectories that descend from the corrupted directory but that allow the non-repair processes to access directories and files that are outside of the corrupted directory and its descendants.

8. The method of claim 1, wherein if the corruption has occurred in a corrupted file, then the obtaining an exclusive lock comprises obtaining, by a repair process, a lock that prevents non-repair processes from accessing the file but that does not prevent the non-repair processes from accessing directories or other files.

9. The method of claim 8, wherein deleting data structure in memory corresponding to the corrupted portion of the metadata comprises freeing or marking for freeing any data structures in memory that are used for accessing data of the file.

10. The method of claim 1, further comprising detecting that corruption has occurred, via an action other than comparing checksums, the action including one or more of checking whether corrupted metadata follows a syntax, whether the corrupted metadata has values outside of predefined ranges, whether the corrupted metadata has values that indicate that a file overlaps another file, and whether the corrupted metadata points to data that no longer exists.

11. The method of claim 1, further comprising, if the corrupted portion of the metadata is security data used for security of the file system, then allowing processes that have obtained access to file system objects that correspond to the corrupted portion of the metadata to continue to access the file system objects.

12. The method of claim 1, further comprising if the corrupted portion of the metadata is security data used for security of the file system, then receiving a request for a file system object for which security data used for security of the file system has been deleted in the corrupted portion, and in response to the request, creating new security data for the file system object, the new security data restricting access to the file system object to an administrator.

13. In a computing environment, a system, comprising:
one or more computers hosting a set of one or more file system components, the file system components providing provide access to a file system, the one or more computers having computer storage elements structured to store instructions, the one or more computers having at least one processing unit to execute the instructions to perform actions, the actions comprising:
detecting that corruption has occurred in a corrupted portion of file system metadata of a volume of a file system;
obtaining an exclusive lock to a file system structure that includes the corrupted portion of the file system metadata while allowing access to non-corrupted portions of the file system metadata;
deleting the corrupted portion of the file system metadata on non-volatile storage while the exclusive lock is maintained in an operation that does not replace the corrupted portion with a redundant copy of the file system metadata in conjunction with the deleting the corrupted portion;
determining that the corrupted portion of the metadata is not security data used for security of the file system, security data comprising security information indicating an entity that is allowed to access a file of the volume of the file system, in response to the determining, deleting data structures in memory corresponding to the corrupted portion of the metadata deleted from the non-volatile storage;
and releasing the exclusive lock.

14. The system of claim 13, further comprising a redundancy manager that maintains redundant copies of the file system metadata, wherein the file system components are structured to perform additional actions, the additional actions comprising:
determining that all of the redundant copies also contain corrupted metadata; and
in response, determining to delete the corrupted portion without replacing the corrupted portion with a redundant copy.

15. The system of claim 13, wherein the one or more file system components comprise a file identifier manager, the file identifier manager stored as additional instructions in the computer storage elements, the one or more computers having at least one processing unit to execute the additional instructions to perform additional actions, the additional actions comprising:
determining that the file identifiers have become corrupted in the corrupted portion of the file system metadata; and recreating a new set of file identifiers based on file metadata that has not been corrupted, the file metadata referred to by the file identifiers prior to the file system metadata becoming corrupted.

16. The system of claim 13, wherein the one or more file system components comprise a file identifier manager, the file identifier manager stored as additional instructions in the computer storage elements, the one or more computers having at least one processing unit to execute the additional instructions to perform additional actions, the additional actions comprising deferring until subsequent access deletion of file identifiers that are not corrupt but that reference files that have been deleted in the deleting the corrupted portion of the file system metadata.

17. The system of claim 13, wherein the file system obtains an exclusive lock to a file system structure by performing actions, comprising obtaining one or more locks that prevent non-repair processes from opening files and directories in the corrupted directory and all subdirectories that descend from the corrupted directory but that allow the non-repair processes to access directories and files that are outside of the corrupted directory and its descendants.

18. A computer storage medium having computer-executable instructions, which when executed perform actions, comprising:
from an application executing on a computer, sending a request to access a file system object of a file system, the file system configured to perform additional actions, the additional actions comprising:
in response to the request, detecting that corruption has occurred in a corrupted portion of metadata of a volume of a file system; obtaining an exclusive lock to a file system structure that includes the corrupted portion of the metadata while allowing access to non-corrupted portions of the metadata;
deleting the corrupted portion of the metadata on non-volatile storage while the exclusive lock is maintained without replacing the corrupted portion with a duplicate copy of the metadata in conjunction with the deleting the corrupted portion;
determining that the corrupted portion of the metadata is not security data used for security of the file system, security data comprising security information indicating an entity that is allowed to access a file of the volume of the file system, in response to the determining, deleting data structures in memory corresponding to the corrupted portion of the metadata deleted from the non-volatile storage;
and releasing the lock; and receiving an indication from the file system that the file system object is not accessible.

19. The computer storage medium of claim 18, wherein the application executes in user mode and at least a portion of the file system executes in kernel mode.

20. The computer storage medium of claim 18, wherein the file system object comprises security data used for security of the file system and further comprising attempting, by the application, to access a file associated with the security data used for security of the file system from the file system, the file system having additional code to perform additional actions, comprising:
creating new security data for the file and associating the new security data with the file; and
denying the application access to the file unless the application is executed with administrator access rights.

* * * * *